(12) United States Patent
Chen et al.

(10) Patent No.: US 9,270,467 B1
(45) Date of Patent: Feb. 23, 2016

(54) SYSTEMS AND METHODS FOR TRUST PROPAGATION OF SIGNED FILES ACROSS DEVICES

(71) Applicant: Symantec Corporation, Mountain View, CA (US)

(72) Inventors: Joseph Chen, Los Angeles, CA (US); Jeffrey Wilhelm, Venice, CA (US)

(73) Assignee: Symantec Corporation, Mountain View, CA (US)

( * ) Notice: Subject to any disclaimer, the term of this patent is extended or adjusted under 35 U.S.C. 154(b) by 120 days.

(21) Appl. No.: 13/895,993

(22) Filed: May 16, 2013

(51) Int. Cl.
*H04L 29/06* (2006.01)
*H04L 9/32* (2006.01)
*G06F 21/64* (2013.01)

(52) U.S. Cl.
CPC ............ *H04L 9/3247* (2013.01); *G06F 21/645* (2013.01); *H04L 9/3236* (2013.01); *H04L 63/123* (2013.01)

(58) Field of Classification Search
CPC .... H04L 63/123; H04L 9/3247; G06F 21/645
See application file for complete search history.

(56) References Cited

U.S. PATENT DOCUMENTS

| | | | | |
|---|---|---|---|---|
| 6,973,572 | B1* | 12/2005 | Elliot | G06F 17/30342 707/999.202 |
| 7,219,134 | B2* | 5/2007 | Takeshima et al. | 709/217 |
| 7,490,352 | B2* | 2/2009 | Kramer et al. | 726/22 |
| 7,509,120 | B2* | 3/2009 | Brown et al. | 455/411 |
| 7,577,848 | B2* | 8/2009 | Schwartz et al. | 713/187 |
| 7,765,396 | B2* | 7/2010 | Haufe | 713/155 |
| 8,112,633 | B1* | 2/2012 | Clyde et al. | 713/187 |
| 8,132,013 | B2* | 3/2012 | Meier | G06F 21/64 705/57 |
| 8,276,202 | B1* | 9/2012 | Dubrovsky et al. | 726/22 |
| 8,385,887 | B2* | 2/2013 | Brown et al. | 455/411 |
| 8,671,449 | B1* | 3/2014 | Nachenberg | H04L 63/145 713/187 |
| 8,769,296 | B2* | 7/2014 | Etchegoyen | G06F 21/121 713/165 |
| 8,813,229 | B2* | 8/2014 | Lee et al. | 726/24 |
| 8,831,569 | B2* | 9/2014 | Brown et al. | 455/411 |
| 2003/0237004 | A1* | 12/2003 | Okamura | 713/201 |
| 2005/0198051 | A1* | 9/2005 | Marr et al. | 707/100 |
| 2006/0218637 | A1* | 9/2006 | Thomas | G06F 21/51 726/23 |

(Continued)

OTHER PUBLICATIONS

Chessa, Stefano; Di Pietro, Roberto; Ferro, Erina; Giunta, Gaetano; Oligeri, Gabriele; "Mobile Application Security for Video Streaming Authentication and Data Integrity Combining Digital Signature and Watermarking Techniques", IEEE 65$^{th}$ Vehicular Technology Conference, Apr. 22-25, 2007, pp. 634-638.*

(Continued)

*Primary Examiner* — Victor Lesniewski
(74) *Attorney, Agent, or Firm* — ALG Intellectual Property, LLC

(57) ABSTRACT

A computer-implemented method for trust propagation of signed files across devices may include identifying a signed file on a device, calculating, on the device, a hash based at least in part on the signed file, querying, with the hash, a server which has verified that the signed file is trustworthy based on a digital signature of the signed file having been verified by an additional device capable of verifying digital signatures, receiving on the device, in response to querying the server, a trust indicator indicating that the digital signature of the signed file has been verified and trusting the signed file on the device, based on the trust indicator indicating that the digital signature of the signed file has been verified. Various other methods, systems, and computer-readable media are also disclosed.

20 Claims, 7 Drawing Sheets

(56) References Cited

U.S. PATENT DOCUMENTS

| | | | |
|---|---|---|---|
| 2008/0189546 A1* | 8/2008 | Yoon | 713/168 |
| 2008/0201722 A1* | 8/2008 | Sarathy | 719/311 |
| 2009/0077261 A1* | 3/2009 | Broadhurst | 709/246 |
| 2009/0271502 A1* | 10/2009 | Xue et al. | 709/219 |
| 2009/0287931 A1* | 11/2009 | Kinsella | 713/175 |
| 2009/0300761 A1* | 12/2009 | Park | G06F 21/562 726/23 |
| 2010/0077482 A1* | 3/2010 | Adams | 726/24 |
| 2010/0313035 A1* | 12/2010 | Turbin | G06F 21/56 713/189 |
| 2011/0167275 A1* | 7/2011 | Niemela | G06F 21/565 713/188 |
| 2012/0002839 A1* | 1/2012 | Niemela | G06K 9/00973 382/100 |
| 2012/0166403 A1* | 6/2012 | Kim et al. | 707/692 |
| 2013/0055369 A1* | 2/2013 | Kumar et al. | 726/7 |
| 2013/0111547 A1* | 5/2013 | Kraemer | 726/1 |
| 2013/0111591 A1* | 5/2013 | Topan | G06F 21/563 726/24 |
| 2014/0040616 A1* | 2/2014 | Barber et al. | 713/168 |
| 2014/0304515 A1* | 10/2014 | Feuerman et al. | 713/176 |

OTHER PUBLICATIONS

Abd-Elrahman, Emad; Abid Mohamed; Afifi, Hossam; "Video Streaming Security: Window-Based Hash Chain Signature Combines with Redundancy Code", IEEE International Symposium on Multimedia, Dec. 13-15, 2010, pp. 33-40.*

* cited by examiner

SYSTEMS AND METHODS FOR TRUST PROPAGATION OF SIGNED FILES ACROSS DEVICES

BACKGROUND

Digital signatures are a popular and effective way of validating the authenticity of a file. Files may be digitally signed using a private key which may be known to only the signatory. The digital signature of a file may be verified by any device with access to the public key of the signatory. Digitally signed files may be verified to have been created by a known sender and to have not been subject to tampering. Both of these properties may be important for sensitive transactions such as financial transfers and software distribution. Because large quantities of transactions may include sensitive information, an efficient method of authenticating the files involved may be very beneficial.

Unfortunately, not all devices may be equipped to authenticate signed files. For example, some devices may not have access to the public key of a signatory. Furthermore, verifying a digital signature may be a resource-intensive process unsuited for certain devices. Traditional methods for validating signed files may require random access to the signed files, which may be impractical or inefficient for some devices. Accordingly, the instant disclosure identifies and addresses a need for additional and improved systems and methods for trust propagation of signed files across devices.

SUMMARY

As will be described in greater detail below, the instant disclosure generally relates to systems and methods for trust propagation of signed files across devices by identifying a signed file on a device which may be unable to verify digital signatures, calculating a hash of the signed file and sending the hash to a server, receiving a trust indicator from the server which identifies the file as having a verified digital signature, and trusting the file based on the trust indicator.

In one example, a computer-implemented method for trust propagation of signed files across devices may include (1) identifying a signed file on a device, (2) calculating, on the device, a hash based at least in part on the signed file, (3) querying, with the hash, a server which may have verified that the signed file may be trustworthy based on a digital signature of the signed file having been verified by an additional device capable of verifying digital signatures, (4) receiving on the device, in response to querying the server, a trust indicator indicating that the digital signature of the signed file may have been verified and (5) trusting the signed file on the device, based on the trust indicator indicating that the digital signature of the signed file may have been verified.

In one embodiment, the device may include a gateway.

In one embodiment, calculating, on the gateway, the hash based at least in part on the signed file may be in response to a policy on the gateway prohibiting untrusted files from passing through the gateway.

In one embodiment, calculating, on the device, the hash based at least in part on the signed file may include excluding at least a portion of the signed file in calculating the hash.

In one embodiment, the server may include a plurality of hashes of verified signed files and/or a plurality of associated trust indicators of verified signed files.

In one embodiment, the additional device verifying the digital signature of the signed file may include using unique information to identify a signatory of the signed file and verifying that the signed file has not been tampered with after being signed by the signatory.

In one embodiment, the digital signature may be separate from the signed file and may be catalogued on the additional device.

In one embodiment, calculating, on the device, the hash based at least in part on the signed file may be in response to the signed file posing a security risk.

In one embodiment, a system for implementing the above-described method may include (1) an identification module that identifies a signed file on a device, (2) a calculation module that calculates, on the device, a hash based at least in part on the signed file, (3) a querying module that queries, with the hash, a server which may have verified that the signed file may be trustworthy based on a digital signature of the signed file having been verified by an additional device capable of verifying digital signatures, (4) a receiving module that may receive on the device, in response to querying the server, a trust indicator indicating that the digital signature of the signed file may have been verified, (5) a trust module that trusts the signed file on the device, based on the trust indicator indicating that the digital signature of the signed file may have been verified and (6) at least one processor configured to execute the identification module, the calculation module, the querying module, the receiving module and the trust module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a signed file on a device, (2) calculate, on the device, a hash based at least in part on the signed file, (3) query, with the hash, a server which may have verified that the signed file may be trustworthy based on a digital signature of the signed file having been verified by an additional device capable of verifying digital signatures, (4) receive on the device, in response to querying the server, a trust indicator indicating that the digital signature of the signed file may have been verified and (5) trust the signed file on the device, based on the trust indicator indicating that the digital signature of the signed file may have been verified.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
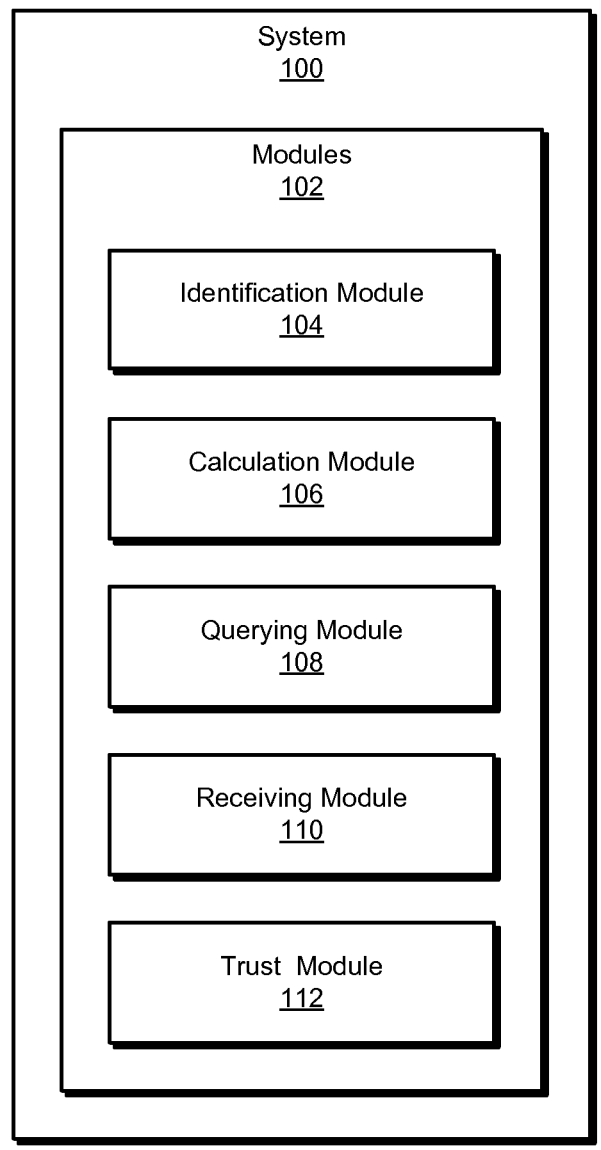
FIG. 1 is a block diagram of an exemplary system for trust propagation of signed files across devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for trust propagation of signed files across devices. As will be explained in greater detail below, by receiving a trust indicator identifying a signed file which indicates that an additional device has verified the signature, a device which may not normally be capable of verifying signatures or which may be a high throughput device may be able to quickly and accurately determine if a file may be trusted.

The following will provide, with reference to FIGS. 1-2 and 4-5, detailed descriptions of exemplary systems for trust propagation of signed files across devices. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for trust propagation of signed files across devices. As illustrated in this figure, exemplary system 100 may include one or more modules 102 for performing one or more tasks. For example, and as will be explained in greater detail below, exemplary system 100 may also include an identification module 104 that may identify a signed file on a device. Exemplary system 100 may additionally include a calculation module 106 that may calculate, on the device, a hash based at least in part on the signed file. Exemplary system 100 may also include a querying module 108 that may query, with the hash, a server which may have verified that the signed file may be trustworthy based on a digital signature of the signed file having been verified by an additional device capable of verifying digital signatures. Exemplary system 100 may additionally include a receiving module 110 that may receive on the device, in response to querying the server, a trust indicator indicating that the digital signature of the signed file may have been verified. Exemplary system 100 may also include a trust module 112 that may trust the signed file on the device, based on the trust indicator indicating that the digital signature of the signed file may have been verified. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
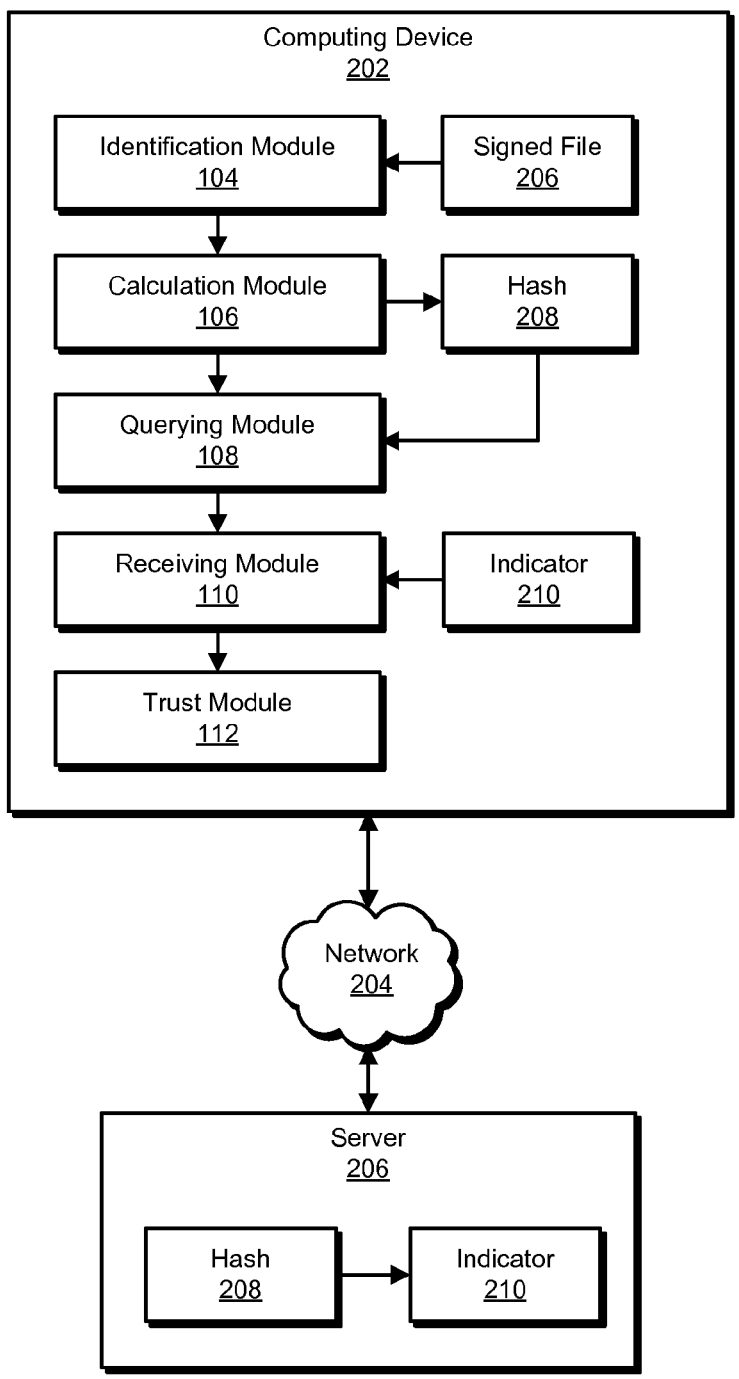
FIG. 2 is a block diagram of an exemplary system for trust propagation of signed files across devices.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, facilitate computing device 202 and/or server 206 in trust propagation of signed files across devices. For example, and as will be described in greater detail below, one or more of modules 102 may facilitate computing device 202 and/or server 206 in trust propagation of signed files across devices. For example, and as will be described in greater detail below, identification module 104 may be programmed to identify a signed file 207 on a device. Calculation module 106 may be programmed to calculate, on the device, a hash 208 based at least in part on signed file 207. Querying module 108 may be programmed to query, with hash 208, a server 206 which has verified that signed file 207 may be trustworthy based on a digital signature of signed file 207 having been verified by an additional device capable of verifying digital signatures. Receiving module 110 may be programmed to receive on the device, in response to querying server 206, a trust indicator 210 indicating that the digital signature of signed file 207 has been verified. Trust module 112 may be programmed to trust signed file 207 on the device, based on the trust indicator 210 indicating that the digital signature of signed file 207 has been verified.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of storing and/or sending hashes and/or trust indicators. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
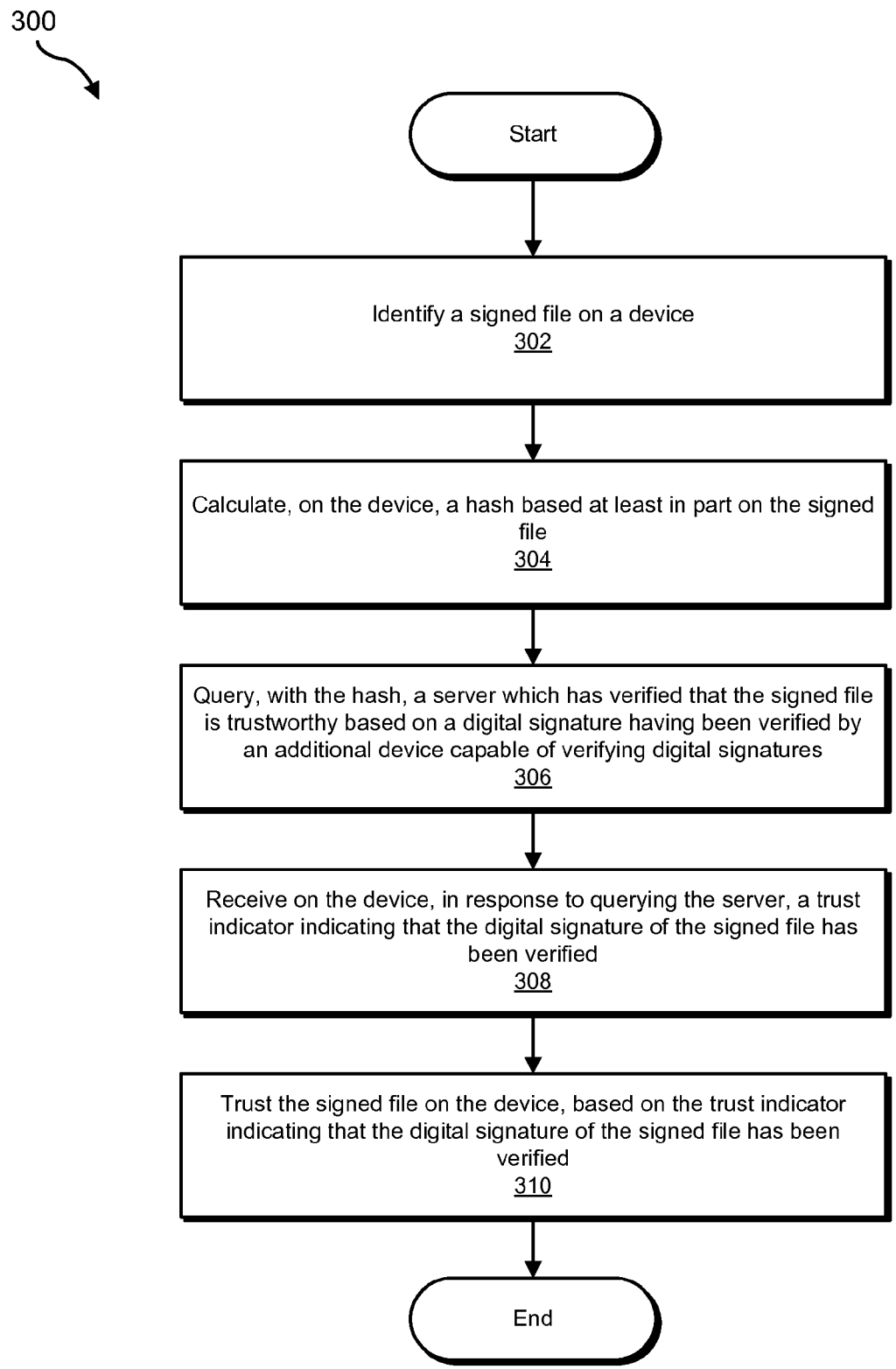
FIG. 3 is a flow diagram of an exemplary method for trust propagation of signed files across devices.

FIG. 3 is a flow diagram of an exemplary computer-implemented method 300 for trust propagation of signed files across devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a signed file on a device. For example, at step 302 identification module 104 may, as part of computing device 202 in FIG. 2, identify a signed file 206 on a device.

For example, identification module 104 may identify a signed file passing through a gateway. In one example, identification module 104 may identify an EXE file that has been digitally signed by SYMANTEC passing through a network gateway.

In some examples, identifying the digitally signed file may include identifying a file and determining that the file may be digitally signed. In some examples, identifying the digitally signed file may include identifying a file that may be digitally signed without making a determination about whether or not the file is digitally signed.

In some embodiments, the device may include a gateway. Examples of gateways may include, without limitation, network servers, firewall servers, proxy servers, protocol mapping gateways and/or routers.

In some embodiments, the device may be an endpoint device. Examples of endpoint devices may include, without limitation, clients, personal computing systems, and/or mobile devices. For example, a mobile device may not be configured with the necessary functionality and/or processing power to verify a digital signature.

At step 304 one or more of the systems described herein may calculate, on the device, a hash based at least in part on the signed file. For example, at step 304 calculation module 106 may, as part of computing device 202 in FIG. 2, calculate, on the device, a hash 208 based at least in part on signed file 207.

For example, calculation module 106 may calculate a hash of the signed file on the gateway. In one example, calculation module 106 may calculate a hash of the first 2 megabytes of the EXE file on the gateway.

In some embodiments, calculation module 106 may use a cryptographic algorithm to generate a hash based at least in part on the signed file. In some examples, calculation module 106 may use the header information of the file to generate the hash. For example, the gateway may calculate the hash "EXE 303212Kb AF2343E" based at least in part on the EXE file on the gateway.

In some embodiments, calculation module 106 may calculate, on the device, the hash based at least in part on the signed file by excluding at least a portion of the signed file in calculating the hash. For example, calculation module 106 may calculate the hash based on the first megabyte of content in the file, excluding the remainder of the content.

In one example, the computing device may include a gateway which may not have the entirety of the signed file in memory at any one time, and which may calculate the hash based on the portion of the file currently in memory. In one example, the computing device may calculate the hash based on multiple sequential portions of the signed file. In this example, the portions of the signed file may not all be stored in memory on the device simultaneously. In some examples, the computing device may only have one opportunity to calculate the hash from the signed file.

In some embodiments, calculation module 106 may calculate, on the gateway, the hash based at least in part on the signed file in response to a policy on the gateway prohibiting untrusted files from passing through the gateway. For example, there may be a policy on the gateway which prohibits files without a verified digital signature from passing through the gateway. In some examples, the gateway may only allow files signed by specific signatories. For example, a gateway programmed to process SYMANTEC software updates may only allow through files signed by SYMANTEC.

In some examples, calculation module 106 may calculate, on the device, the hash based at least in part on the signed file in response to the signed file posing a security risk. In some examples, the signed file may be of a file type that may be capable of malicious action. For example, the file may be an EXE file which may be a legitimate software program or may be a malicious virus. In some examples, the signed file may include content which may pose a security risk. For example, the file may be a phishing scam posing as a request for financial information from a bank.

As used herein, the term "hash" may refer to any abbreviated representation of a file and/or the contents of a file. For example, the term "hash" may refer to the outputs of one or more hash functions, fingerprints, checksums, and/or any other type of file identifiers that uniquely identify a file and/or file content (barring a collision). For example, the hash may be generated by any of a variety of cryptographic hash functions (including, e.g., MD5 and/or SHA256).

At step 306 one or more of the systems described herein may query, with the hash, a server which has verified that the signed file is trustworthy based on a digital signature of the signed file having been verified by an additional device capable of verifying digital signatures. For example, at step 306 querying module 108 may, as part of computing device 202 in FIG. 2, query, with hash 208, a server 206 which has verified that signed file 207 is trustworthy based on a digital signature of signed file 207 having been verified by an additional device capable of verifying digital signatures.

For example, querying module 108 may send a hash identifying the signed file to a server which may have verified the signed file as trustworthy based on receiving from an additional device an indication that the additional device may have verified the digital signature. For example, querying module 108 may send a hash of the EXE file to a reputation server, which may have verified that the EXE file may be trustworthy based on an additional device having used SYMANTEC's public key to verify the digital signature of the EXE file. For example, the additional device may have generated a hash of the EXE file (e.g., using the same hashing algorithm and/or parameters as querying module 108) and sent a message to the reputation server indicating that the hash corresponds to a file whose digital signature has been verified.

In some embodiments, the additional device verifying the digital signature of the signed file may include using (1) unique information to identify a signatory of the signed file and (2) verifying that the signed file has not been tampered with after being signed by the signatory. In some embodiments, the additional device may use a public key belonging to the signatory to determine that the signed file may have been signed by the signatory and may not have been tampered with after being signed. For example, the additional device may use a public key belonging to SYMANTEC to verify that an EXE file may have been signed by SYMANTEC and may not have been tampered with.

In some embodiments, the server may include a plurality of hashes of verified signed files and/or a plurality of associated trust indicators of verified signed files. For example, the server may include an extensive database of hashes of files digitally signed by SYMANTEC and corresponding trust indicators. In some examples, the server may receive the plurality of hashes and/or the plurality of associated trust indicators from a plurality of client devices that check digital signatures of files.

In some embodiments, the server may include a reputation server which may maintain a database of verified signed files and hashes representing the verified signed files. For example, a reputation server may include an extensive database of files digitally signed by SYMANTEC and corresponding hashes.

In some examples, the server may analyze one or more reports of verified signed files associated with hashes to identify potentially false and/or suspect reports of digital signature verifications of files and to remove and/or discount the false and/or suspect reports. For example, the server may determine that an untrusted and/or unknown device sent reports of digital signature verifications and disregard those reports. As another example, the server may determine that multiple sources have sent conflicting reports of the digital signature verification of a file. In this example, the server may trust the majority report, may trust the report of one or more trusted sources over untrusted sources, and/or may request that one or more of the trusted sources submit the file for analysis by the server so that the server can directly verify the digital signature of the file. In some examples, the server may request (e.g., randomly and/or based on a trust level) that a source of digital signature verifications submit a file for which the source claimed to have verified a digital signature in order to directly assess whether the digital signature of the file is valid. In this example, the server may modify a trust level toward the source based on whether the source provided correct or false information about the digital signature of the file.

In some embodiments, the server may be a security server which may be configured to verify the security of files and devices on the network. For example, a security server may verify digital signatures and/or run malware checks.

In some embodiments, the server may include the additional device. For example, the server may be configured to store hashes of digitally signed files and/or trust indicators of digitally signed files, and may also be configured to verify digital signatures.

As used herein, the phrase "digital signature" and/or term "signature" generally refer to any process and/or information which may be applied to a file and which may be maintained under the sole control of a signatory, may be capable of uniquely identifying the signatory, and/or may be connected to the signed data in such a way that any alteration of the data after being signed may be detectable.

Figure 4:
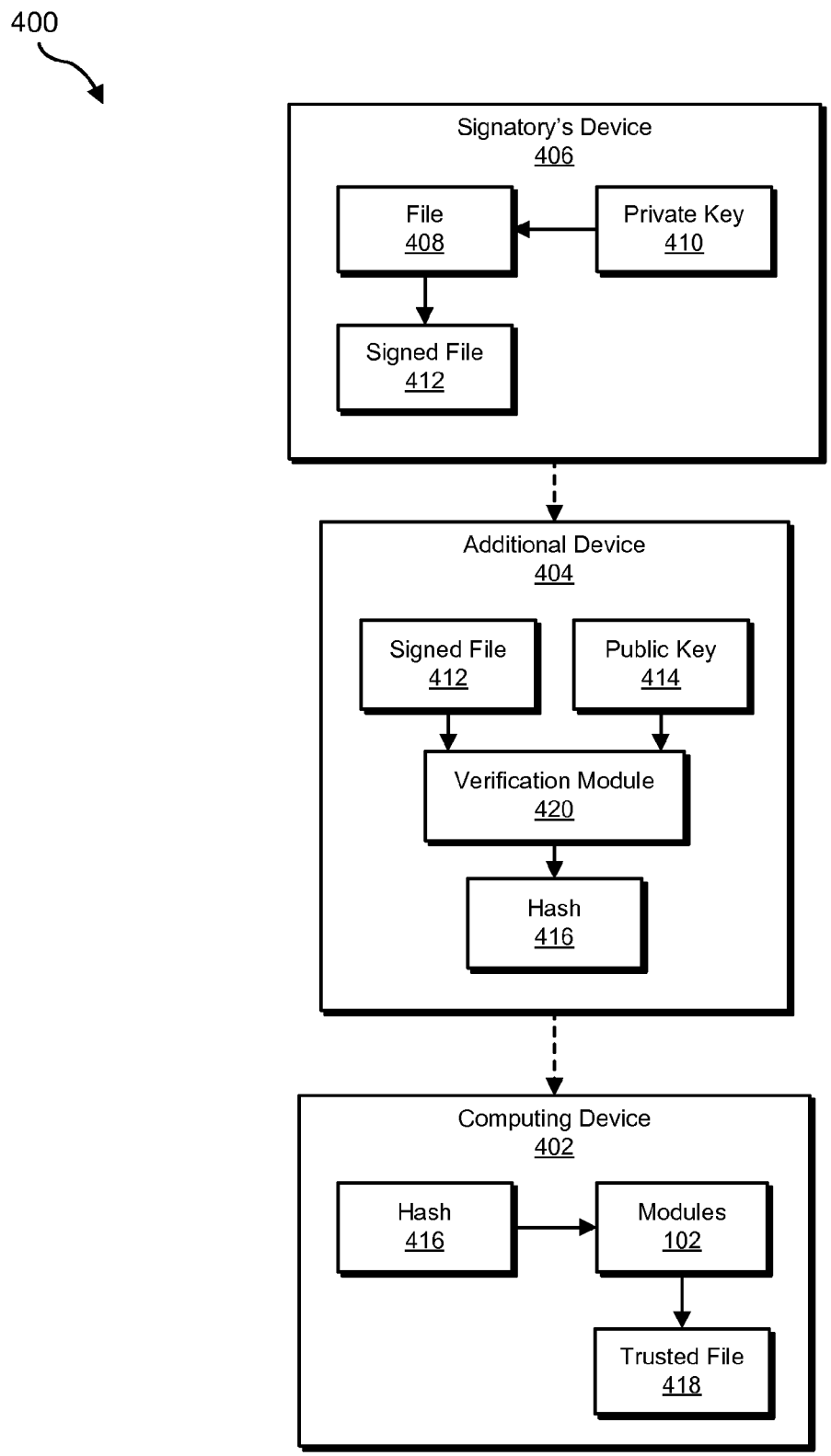
FIG. 4 is a block diagram of an exemplary system for trust propagation of signed files across devices.

FIG. 4 is a block diagram of an exemplary computing system 400 for trust propagation of signed files across devices. In one embodiment, a file 408 may be signed on a signatory's device 406, becoming a signed file 412. An additional device 404 may identify signed file 412, and verification module 420 may use a public key 414 to generate a hash 416 identifying signed file 412. A computing device 402 may receive hash 416. Modules 102 on computing device 402 may use hash 416 to determine that signed file 412 may be trusted file 418.

For example, a signatory may sign a file with the signatory's private key and may send the signed file to a server. The server may verify the signature using the signatory's public key and may send a hash identifying the signed file to a gateway. The signed file may also be passing through the gateway. The gateway may receive the hash identifying the signed file and may determine that the signed file may be a trusted file and may be allowed through the gateway.

In one example, SYMANTEC may sign a file using SYMANTEC's private key on a SYMANTEC server, and may send the signed file to an external server. The external server may validate the signature of the signed file with SYMANTEC's public key and may send a hash identifying the signed file to a gateway. The gateway may determine that the hash represents a trusted file from SYMANTEC and may allow the trusted file to pass through the gateway.

Figure 5:
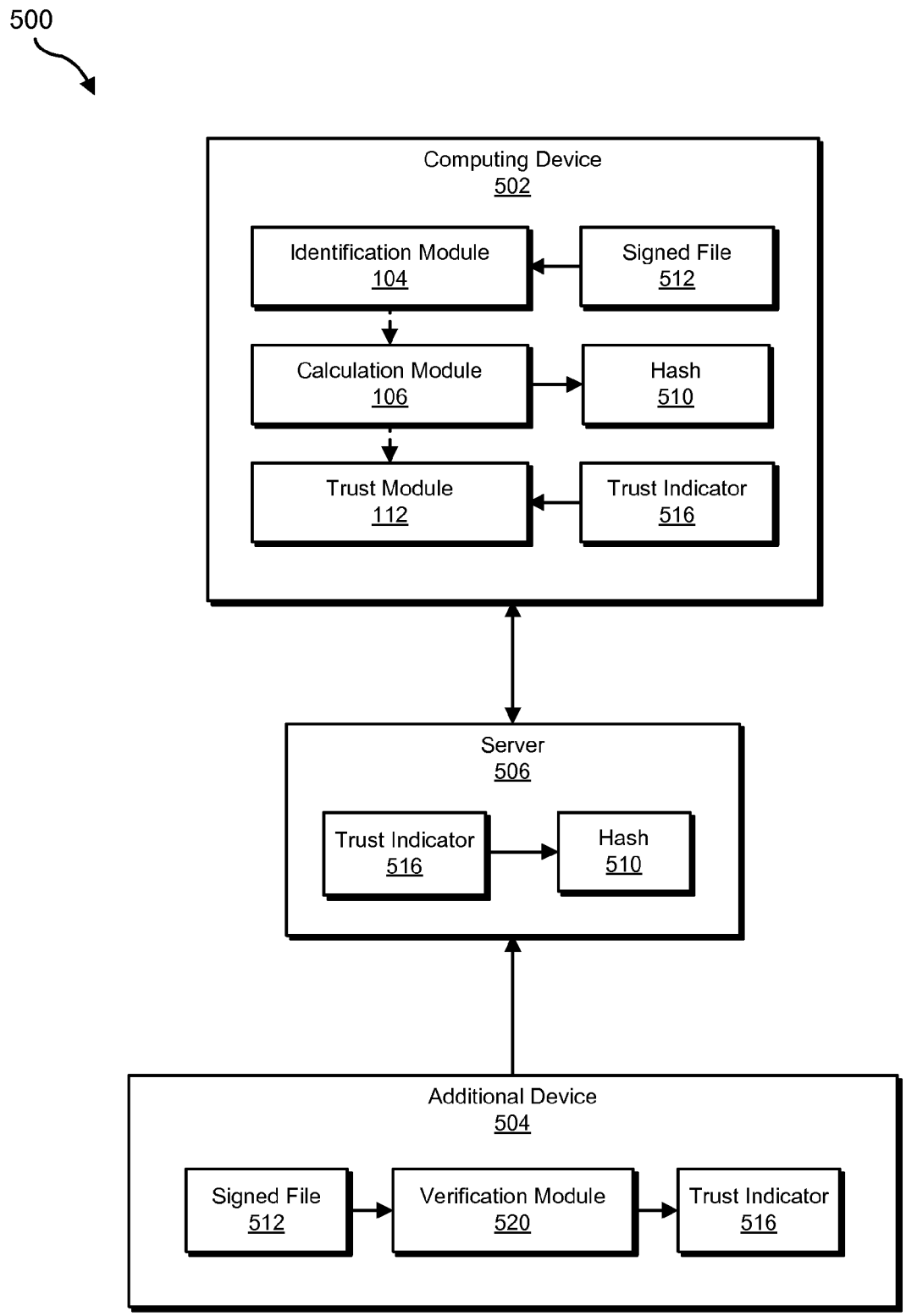
FIG. 5 is a block diagram of an exemplary system for trust propagation of signed files across devices.

As illustrated in FIG. 5, computing device 502 may be connected to server 506, which may be connected to additional device 504. Identification module 104 on computing device 502 may identify signed file 512. Calculation module 108 on computing device 502 may calculate hash 510. Server 506 may include hash 510 and may correlate hash 510 with trust indicator 516. Server 506 may have received trust indicator 516 from additional device 504, which may have verified signed file 512 by means of verification module 520 and may have then generated trust indicator 516. Computing device 502 may receive trust indicator 516 from server 506, and trust module 112 on computing device 502 may trust signed file 512 based on trust indicator 516.

For example, a gateway may be connected to a reputation server, which may be connected to an additional device configured to verify digital signatures. The gateway may identify a digitally signed file and may calculate a hash of the digitally signed file. The hash may also exist on the reputation server, which may correlate the hash with a trust indicator indicating that the digital signature of the file has been verified. The trust indicator may have been generated by the additional device, which may have verified the digital signature of the file. The gateway may receive the trust indicator from the reputation server and may trust the signed file based on the trust indicator.

In some embodiments, the digital signature may be separate from the signed file and may be catalogued on the additional device. In some examples, the digital signature may be included in a collection of digital signatures stored on the additional device. For example, the digital signature may be included in a digitally-signed catalog file which may include a collection of cryptographic hashes each corresponding to a separate file. In one example, the digital signature may include a signed catalog of a driver package and may include digital signatures for all of the files installed by the driver package. In this example, the signed catalog may not be available on the device and may be stored on the additional device.

Returning to FIG. 3, at step 308 one or more of the systems described herein may receive on the device, in response to querying the server, a trust indicator indicating that the digital signature of the signed file has been verified. For example, at step 308 receiving module 110 may, as part of computing device 202 in FIG. 2, receive on the device, in response to querying server 206, a trust indicator 210 indicating that the digital signature of signed file 207 has been verified.

For example, receiving module 110 may receive, on the gateway, a trust indicator indicating that the digital signature of the signed file may have been verified as valid. In one example, receiving module 110 may receive, on the gateway, a token that may serve as a trust indicator for the signed file. The token may indicate that the signed file may have been verified by an additional device as has having a valid digital signature. In some examples, the trust indicator may include a trust rating of the file (e.g., on a number scale) based on the verification of the digital signature of the file in combination with one or more additional trust factors.

At step 310 one or more of the systems described herein may trust the signed file on the device, based on the trust indicator indicating that the digital signature of the signed file has been verified. For example, at step 310 trust module 112 may, as part of computing device 202 in FIG. 2, trust signed file 207 on the device, based on the trust indicator 210 indicating that the digital signature of signed file 207 has been verified.

For example, trust module 112 may determine that the signed file may be trustworthy based the trust indicator. For example, the gateway may trust the EXE file signed by Symantec based on determining that the trust indicator of the EXE file on the gateway indicates that the file may have a verified digital signature.

As explained above in connection with method 300 in FIG. 3, a computing device, in some embodiments including a gateway, may identify a digitally signed file on the device. The device may be unable to verify the digital signature, and/or may be a high throughput device on which verifying signatures would be inefficient. The device may calculate a hash of the signed file. The hash may be based at least in part on the file, and/or may exclude at least a part of the file. The device may send the hash to a server which may have a trust indicator for the device.

The server may be connected with an additional device which may be capable of verifying digital signatures and which may have verified the digital signature of the signed file. The additional device may be a server programmed to verify digital signatures, a client, and/or another type of device. The device may receive a trust indicator from the server and may trust the signed file based on the trust indicator. In some embodiments, the device may be a gateway which only allows files to pass through which include a trusted digital signature. In some embodiments, verifying the digital signature on the additional device may be significantly faster than verifying the digital signature on the gateway.

Figure 6:
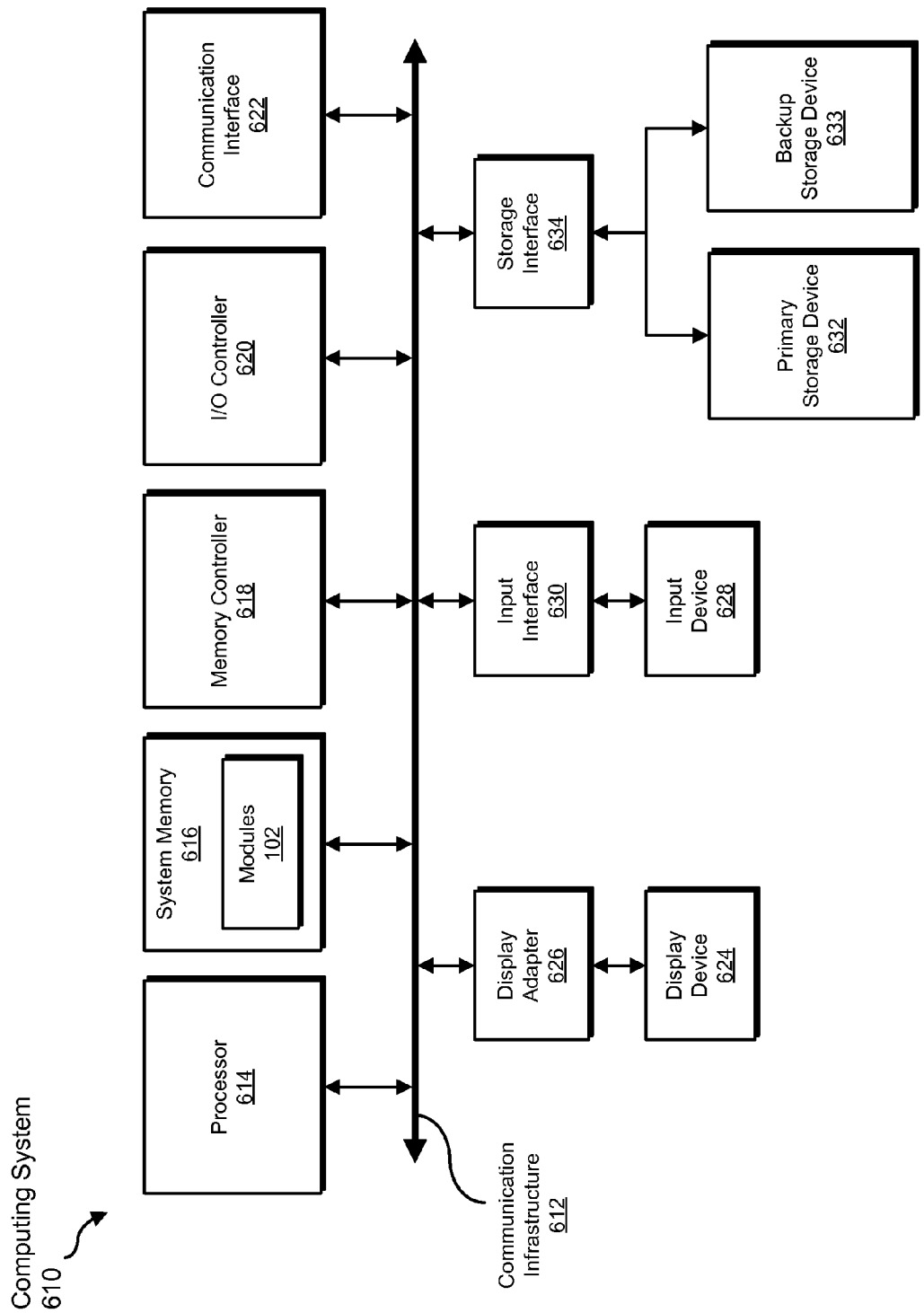
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, receiving, calculating, determining and/or trusting steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
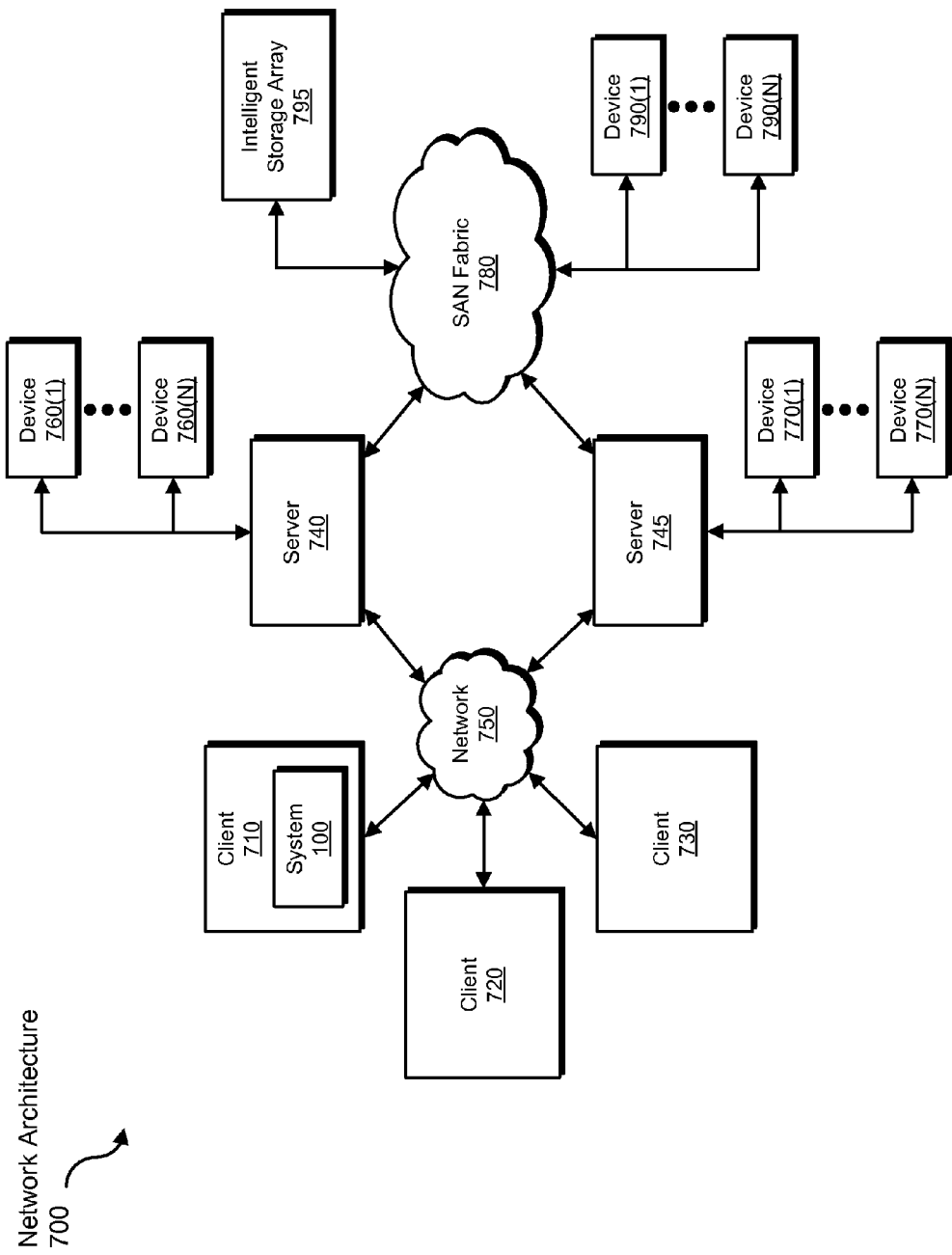
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, receiving, calculating, determining and/or trusting steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for trust propagation of signed files across devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a file to be transformed, transform the file, output a result of the transformation to a device, use the result of the transformation to verify if a file may be trusted, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for trust propagation of signed files across devices, at least a portion of the method being performed by a computing device comprising at least one processor, the method comprising:
    identifying a signed file on a device;
    calculating, on the device, a hash of the signed file based on at least a portion of the signed file;
    querying, by the device, a server, the query comprising the hash of the signed file, and the server having verified that the signed file is trustworthy based on a digital signature of the signed file having been verified by an additional device that is capable of verifying digital signatures and that is separate from the server, wherein:
        prior to receiving the query, the server received, from the additional device:
            a hash that matches the hash of the signed file;
            a message indicating that the hash corresponds to a file whose digital signature has been verified by the additional device;
        the server received the hash that matches the hash of the signed file and the message from the additional device by receiving a plurality of hashes and a plurality of associated trust indicators from a plurality of client devices that check digital signatures of files, the plurality of client devices comprising the additional device;
        the server comprises a database of hashes of files and corresponding trust indicators, the database comprising the hash received from the additional device and a trust indicator indicating that the digital signature of the signed file has been verified;
    receiving on the device, in response to querying the server, the trust indicator indicating that the digital signature of the signed file has been verified;
    trusting the signed file on the device, based on the trust indicator indicating that the digital signature of the signed file has been verified.

2. The computer-implemented method of claim 1, wherein the device comprises a gateway.

3. The computer-implemented method of claim 2, wherein calculating the hash comprises calculating the hash in response to a policy on the gateway prohibiting untrusted files from passing through the gateway.

4. The computer-implemented method of claim 2, wherein the gateway comprises a protocol-mapping gateway.

5. The computer-implemented method of claim 2, wherein:
    calculating the hash comprises calculating the hash based on multiple sequential portions of the signed file;
    the multiple sequential portions are not all stored in memory of the gateway simultaneously.

6. The computer-implemented method of claim 1, wherein the additional device verifies the digital signature of the signed file by using unique information to identify a signatory of the signed file and verifying that the signed file has not been tampered with after being signed by the signatory.

7. The computer-implemented method of claim 1, wherein the digital signature is separate from the signed file and is catalogued on the additional device.

8. The computer-implemented method of claim 1, wherein calculating the hash comprises excluding at least a portion of the signed file in calculating the hash.

9. A system for trust propagation of signed files across devices, the system comprising:
    an identification module that identifies a signed file on a device;
    a calculation module that calculates, on the device, a hash of the signed file based on at least a portion of the signed file;
    a querying module that queries, by the device, a server, the query comprising the hash of the signed file, and the server having verified that the signed file is trustworthy based on a digital signature of the signed file having been verified by an additional device that is capable of verifying digital signatures and that is separate from the server, wherein:
        prior to receiving the query, the server received, from the additional device:
            a hash that matches the hash of the signed file;
            a message indicating that the hash corresponds to a file whose digital signature has been verified by the additional device;
        the server received the hash that matches the hash of the signed file and the message from the additional device by receiving a plurality of hashes and a plurality of associated trust indicators from a plurality of client devices that check digital signatures of files, the plurality of client devices comprising the addition device;
        the server comprises a database of hashes of files and corresponding trust indicators, the database comprising the hash received from the additional device and a trust indicator indicating that the digital signature of the signed file has been verified;
    a receiving module that receives on the device, in response to querying the server, the trust indicator indicating that the digital signature of the signed file has been verified;
    a trust module that trusts the signed file on the device, based on the trust indicator indicating that the digital signature of the signed file has been verified;
    at least one physical processor configured to execute the identification module, the calculation module, the querying module, the receiving module, and the trust module.

10. The system of claim 9, wherein:
    the device comprises a gateway;
    the calculation module calculates the hash based on multiple sequential portions of the signed file;

the multiple sequential portions are not all stored in memory of the gateway simultaneously.

11. The system of claim 10, wherein the calculation module calculates the hash in response to a policy on the gateway prohibiting untrusted files from passing through the gateway.

12. The system of claim 9, wherein the calculation module calculates the hash by excluding at least a portion of the signed file in calculating the hash.

13. The system of claim 9, wherein the device lacks the necessary functionality and/or processing power to verify digital signatures.

14. The system of claim 9, wherein the additional device verifies the digital signature of the signed file by using unique information to identify a signatory of the signed file and verifying that the signed file has not been tampered with after being signed by the signatory.

15. The system of claim 9, wherein the digital signature is separate from the signed file and is catalogued on the additional device.

16. The system of claim 9, wherein the calculation module calculates the hash in response to the signed file posing a security risk.

17. A non-transitory computer-readable-storage medium comprising one or more computer-readable instructions that, when executed by at least one processor of a computing device, cause the computing device to:
   identify a signed file on a device;
   calculate, on the device, a hash of the signed file based on at least a portion of the signed file;
   query, by the device, a server, the query comprising the hash of the signed file, and the server having verified that the signed file is trustworthy based on a digital signature of the signed file having been verified by an additional device that is capable of verifying digital signatures and that is separate from the server, wherein:
      prior to receiving the query, the server received, from the additional device:
         a hash that matches the hash of the signed file;
         a message indicating that the hash corresponds to a file whose digital signature has been verified by the additional device;
      the server received the hash that matches the hash of the signed file and the message of the additional device by receiving a plurality of hashes and a plurality of associated trust indicators from a plurality of client devices that check digital signatures of files, the plurality of client devices comprising the additional device;
      the server comprises a database of hashes of files and corresponding trust indicators, the database comprising the hash received from the additional device and a trust indicator indicating that the digital signature of the signed file has been verified;
   receive on the device, in response to querying the server, the trust indicator indicating that the digital signature of the signed file has been verified;
   trust the signed file on the device, based on the trust indicator indicating that the digital signature of the signed file has been verified.

18. The non-transitory computer-readable-storage medium of claim 17, wherein:
   the device comprises a gateway;
   the one or more computer-readable instructions cause the computing device to calculate the hash by calculating the hash based on multiple sequential portions of the signed file;
   the multiple sequential portions are not all stored in memory of the gateway simultaneously.

19. The non-transitory computer-readable-storage medium of claim 17, wherein the device lacks the necessary functionality and/or processing power to verify digital signatures.

20. The non-transitory computer-readable-storage medium of claim 17, wherein the one or more computer-readable instructions cause the computing device to calculate the hash by excluding at least a portion of the signed file in calculating the hash.

* * * * *

UNITED STATES PATENT AND TRADEMARK OFFICE
CERTIFICATE OF CORRECTION

Page 1 of 1

PATENT NO.        : 9,270,467 B1
APPLICATION NO.   : 13/895993
DATED             : February 23, 2016
INVENTOR(S)       : Joseph Chen In the Claims Claim 9, Column 16, Line 47 should read:
rality of client devices comprising the additional Claim 17, Column 18, Line 5 should read:
signed file and the message from the additional device by Signed and Sealed this
Thirty-first Day of January, 2017

Michelle K. Lee
*Director of the United States Patent and Trademark Office*